INVENTOR.
UWE A. POMMERENING
BY
ATTORNEY

INVENTOR.
UWE A. POMMERENING
BY
ATTORNEY

000
United States Patent Office 3,363,045
Patented Jan. 9, 1968

3,363,045
SONAR TARGET SIMULATOR
Uwe A. Pommerening, Webster, N.Y., assignor to Stromberg-Carlson Corporation, Rochester, N.Y., a corporation of Delaware
Filed Nov. 23, 1966, Ser. No. 596,477
7 Claims. (Cl. 35—10.4)

ABSTRACT OF THE DISCLOSURE

Directional information is synthesized by delaying a prerecorded sonar signal for various different, predetermined intervals. The signal so delayed is fed selectively to respective different inputs of a sonar so that the signal arrives at different times at the different inputs in like manner as an actual signal.

Brief summary of the invention

This invention relates generally to recording and reproducing systems, and, more particularly, to a sound reproducing system for use in conjunction with a sonar system of the type having an array of hydrophones mounted in fixed position upon a support and electrically trainable for sensing direction.

In underwater echo ranging or listening, a common type of sonar equipment employs a sound head disposed usually beneath the hull of a ship, and including some forty-eight hydrophones arranged in a ring about a vertical axis. For transmission purposes, all of the hydrophones are pulsed simultaneously to produce an omnidirectional circular sound wave pulse radiating underwater from the sound head. Echoes from objects or other discontinuities encountered by the transmitted pulse are sensed separately by the different hydrophones of the array. Each hydrophone acts as a separate, essentially nondirectional transducer converting the acoustic energy of the echo into an electrical signal. Sounds in the water produced independently of the pulses transmitted by the sound head are also detected by the hydrophones.

One type of equipment for simulating sonar target detection and tracking in a sonar equipment of this type is described in U.S. Patent No. 2,991,562 issued July 11, 1961, to Donald G. C. Hare. In that system, an actual signal as produced by a master ship sonar is recorded on a multitrack magnetic tape, and subsequently played back through an own ship sonar for training purposes. The effect is to produce a signal output from the own ship sonar very closely approximating the signals produced by the master ship sonar. The patented system is believed to be highly effective and useful. It is, however, of relatively complex construction, requires a multichannel recording system including frequency multiplexing equipment, and requires a separate tracking run of the master ship for each different exercise it is desired to carry out.

The simulator of the present invention is of relatively simple construction and highly versatile in operation, whereby it is well-suited not only for simulating the tracking of targets for operator practice, but also for very rapid scanning for checking the operation of the own ship sonar, either on board or in manufacture prior to delivery of the sonar to a customer. In the system of the invention, only a single signal is recorded, that is, an electrical signal produced by a single hydrophone of an actual sonar equipment. The signal is played back to the own ship sonar with synthesized directional information added to it, so that the own ship sonar receives multiple signals as would be produced by a sound head comprising an array of hydrophones. The directional information is synthesized by the simulator of the invention under control of an operator, or in accordance with a predetermined sequence or pattern, so that the entire sonar equipment except for the hydrophones may be rapidly checked for proper operation, or, alternatively, any desired type of tracking maneuver may be simulated.

In ordinary operation of the common type of sonar hereinabove referred to, the hydrophones are connected in groups, or sets for receiving sound signals. Typically, twelve adjacent hydrophones, which would include an arm of 82½° are grouped into a set, but it will be appreciated that the simulator of the invention may be modified in obvious ways for operation with any desired grouping arrangement.

In accordance with a presently preferred embodiment of the invention, the directional information is synthesized by a delay line arrangement, and time division multiplex (TDM) techniques are used for controlling the distribution of the recorded signal to the various electrical inputs of the own ship sonar, whereby the use of mechanical switches is avoided, and the reliability of an all electronic system is achieved with a minimum of equipment.

In the practice of the invention, the simulated target appears, in effect, to jump discontinuously in direction by angular increments equal to the angular spacings of the hydrophones, but because, especially with the forty eight hydrophone sound head, the hydrophones are relatively close together, the discontinuity is tolerable for training purposes. Moreover, for system checking, the discontinuity of apparent motion is immaterial.

Representative embodiments of the invention will now be described in connection with the accompanying drawings, wherein.

Briefly, directional information in the simulator of the invention is synthesized by applying the recorded signal to the various different electrical inputs of the own ship sonar in predetermined timed sequence. In general, because of the relatively small size of the hydrophone array as compared to the distance from an echo or other sound source, the wave front of an underwater sound reaching the sound head may be regarded as essentially planar. It is, therefore, not a difficult matter, knowing the speed of sound in sea water, to calculate the relative times at which a sound would reach the successive hydrophones of a group, or set in the sound head. Signal delay means are included in the simulator of the invention for delaying the recorded signal for different intervals, corresponding to the time differentials as calculated for the own ship sonar, and for selectively applying the signals to different ones of the electrical inputs of the own ship sonar at the end of each interval. In the embodiments shown in FIGURES 1 and 2, the signal is delayed by electrical or glass delay lines, while in the embodiment shown in FIGURES 3A and 3B, the delays are accomplished by storing the recorded signal on capacitors and then successively discharging the capacitors into integrator circuits from which they are fed to the respective sonar inputs.

Figure 1:
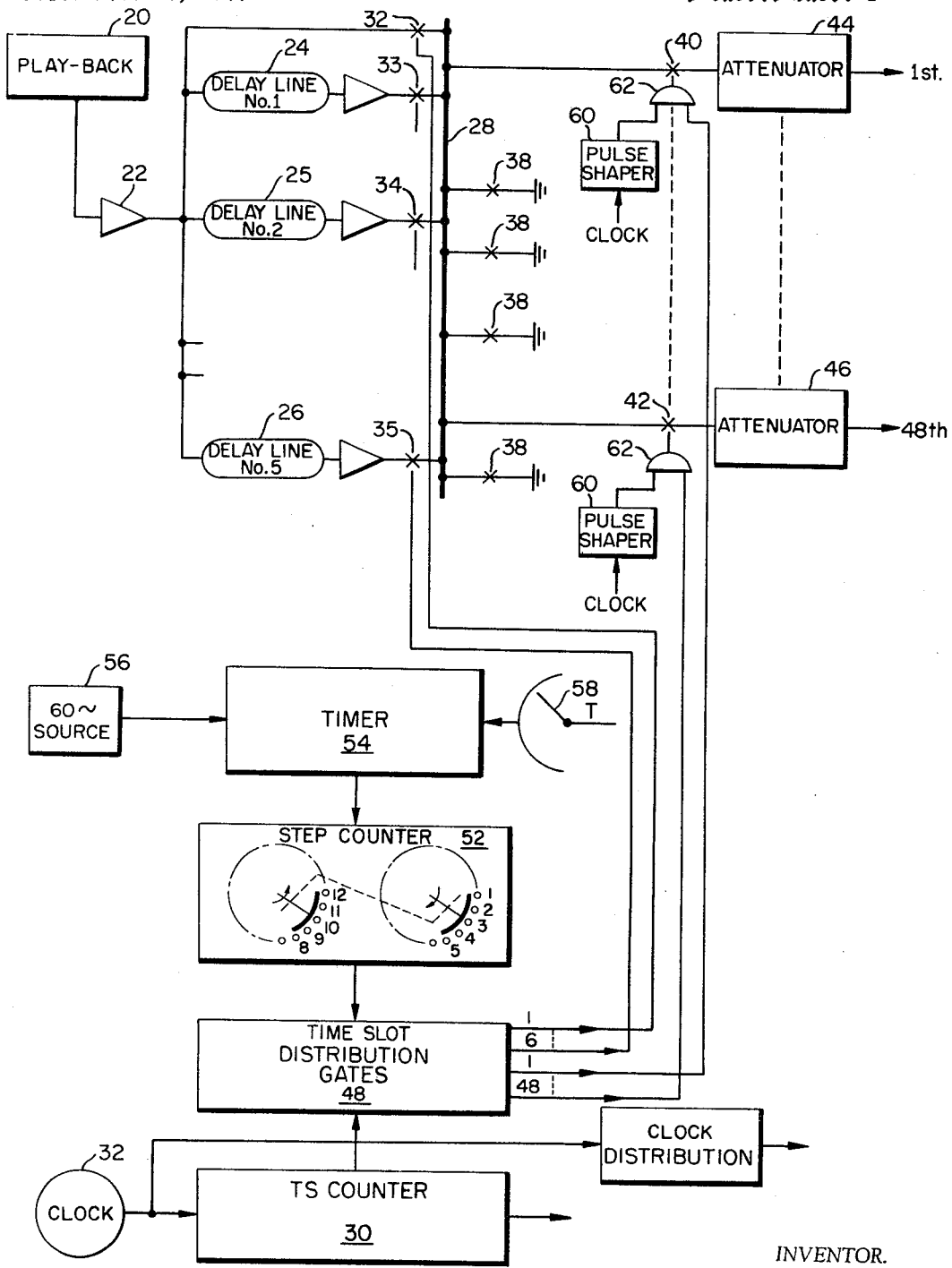
FIGURE 1 is a schematic block diagram of a sonar target simulator in accordance with a first embodiment of the invention.

Referring now to FIGURE 1, a recorded signal taken, for example, from a master ship hydrophone during an actual tracking exercise and recorded on any desired medium such as, for example, a magnetic tape, is detected by a play-back unit 20 and amplified by an amplifier 22 to a level suitable for processing by TDM techniques. From the amplifier, the signal is fed to a bank of delay lines 24, 25, and 26 equal in number to one less than half the number of hydrophones in the sound head that are to be grouped for creating the directional pattern. In the instant case where twelve hydrophones are to be grouped, there would be five delay lines. If only six hydrophones were to be grouped, two delay lines would suffice.

The delays of the respective delay lines 24–26 are arranged to correspond to the intervals at which an actual plane wave signal would strike successive hydrophones in the own ship sound head. In the instance illustrated, the target is assumed to lie in a direction coincident with the bisector of the angle between two adjacent hydrophones, which may be called the middle hydrophones. Successive hydrophones in pairs on opposite sides of the middle hydrophones receive the signal at successively later times in accordance with the calculated requirements as hereinabove described. The delays of the delay lines 24–26 create these various different intervals. In a twelve hydrophone array, for example, hydrophones 6th and 7th receive the signal from the amplifier 22 without delay, as if they were astride the target line of sight. Signals to the heads first and twelfth are subjected to the maximum delay.

The simulator ties into the own ship sonar in place of the outputs of the hydrophones, which are preferably switched out of the equipment, but may, alternatively, be isolated by other circuit arrangements as desired so as not unduly to load the simulator.

The outputs of the various delay lines 24–26 constitute signals analogous to those received by successive hydrophones in a particular sector of an actual array. It is now only necessary to apply the output signals from the delay lines 24–26, and from the amplifier 22, on a selective basis to the respective electrical inputs of the sonar to simulate tracking of an actual target, or to check the sonar.

This may be done by feeding the outputs of the delay lines 24–26 through a mechanically driven switch as described hereinafter in connection with the embodiment shown in FIGURE 2. In the present embodiment, it is done by a switching system based on TDM techniques thus avoiding the reliability problems encountered in mechanically operatable switches. The outputs of the amplifier 22 and of all the delay lines 24–26 are fed onto a TDM highway 28 in successive time slots under control of a time slot counter 30, which in timed succession opens time slot gates 32, 33, 34, and 35 leading onto the highway 28. Clamping gates 38 are operated in unison during the guard period of each time slot in accordance with conventional practice to prevent cross talk between the outputs of the amplifier and of the different delay lines. The time slots in which the signals are fed to the highway 28 are assigned in accordance with a fixed pattern, so that the output of the amplifier 22 and of the delay lines 24–26 always appear in the same respective time slots of the time frame of the system, which may be, for example, of 50 microseconds' duration.

The signals are gated from the highway 28 into the sonar equipment through sampling gates 40 and 42, only two of which are shown, but which are equal in number to the number of hydrophones in the sound head of the sonar. The sampling gates 40 and 42 are operated selectively in synchronism with the time slot gates 32–35, so that any of the signals from the amplifier 22 and from the delay lines 24–26 may be applied to any one or more of the electrical inputs of the sonar. The signals are reduced in amplitude to the proper level by attenuators 44 and 46 connected between the sampling gates 40 and 42 and the sonar equipment.

The time slot gates 32–35 and the clamping gates 38 are operated by the time slot counter 30, which, in turn, is driven by the system clock 32. The time slot gates 32–35 and the sampling gates 40 and 42 are selected by a distribution matrix 48 in accordance with known principles, responsively to a step counter 52 so that different groups of sampling gates 40 and 42 are operated synchronously with the operation of the time slot gates 32–35 to simulate tracking of a target around the sound head of the sonar.

The step counter 52 is indicated schematically as a mechanically driven switch, but in practice is preferably an electronic circuit. Electronic step counter circuits, and circuits for all of the elements shown as blocks in the drawing are well known and will not be described herein because their design is not part of the invention.

The step counter 52 may be operated responsively to a programmed control (not shown) to simulate any desired precomputed tracking maneuver. This would commonly be done when the simulator is used for training. For purposes of checking operation of the sonar equipment, however, the step counter 52 may, more simply, be driven by a timer circuit 54 responsively to a 60 cycle per second clock signal such as may be taken from the own ship power supply indicated by the box 56. For manual control, the timer 54 may be operated responsively to a variable resistor control 58.

For precise synchronization, the system clock 32 is distributed to the sampling gates 40 and 42. The clock pulses are first reshaped by pulse shapers 60, and then applied through AND gates 62 with the pulses from the distribution matrix 48.

The particular sonar equipment for which the hereinabove described embodiment of the invention was first developed uses audio delay lines for obtaining directional information from its sound head. The simulator of this embodiment also uses audio delay lines 24–26, and, accordingly, the delay accuracy of the simulator is of the same order of magnitude as the delay accuracy of the sonar equipment itself. If greater accuracy is desired, it may be achieved in accordance with the invention by resorting to the modified forms shown in FIGURES 2, and 3A and 3B.

Figure 2:
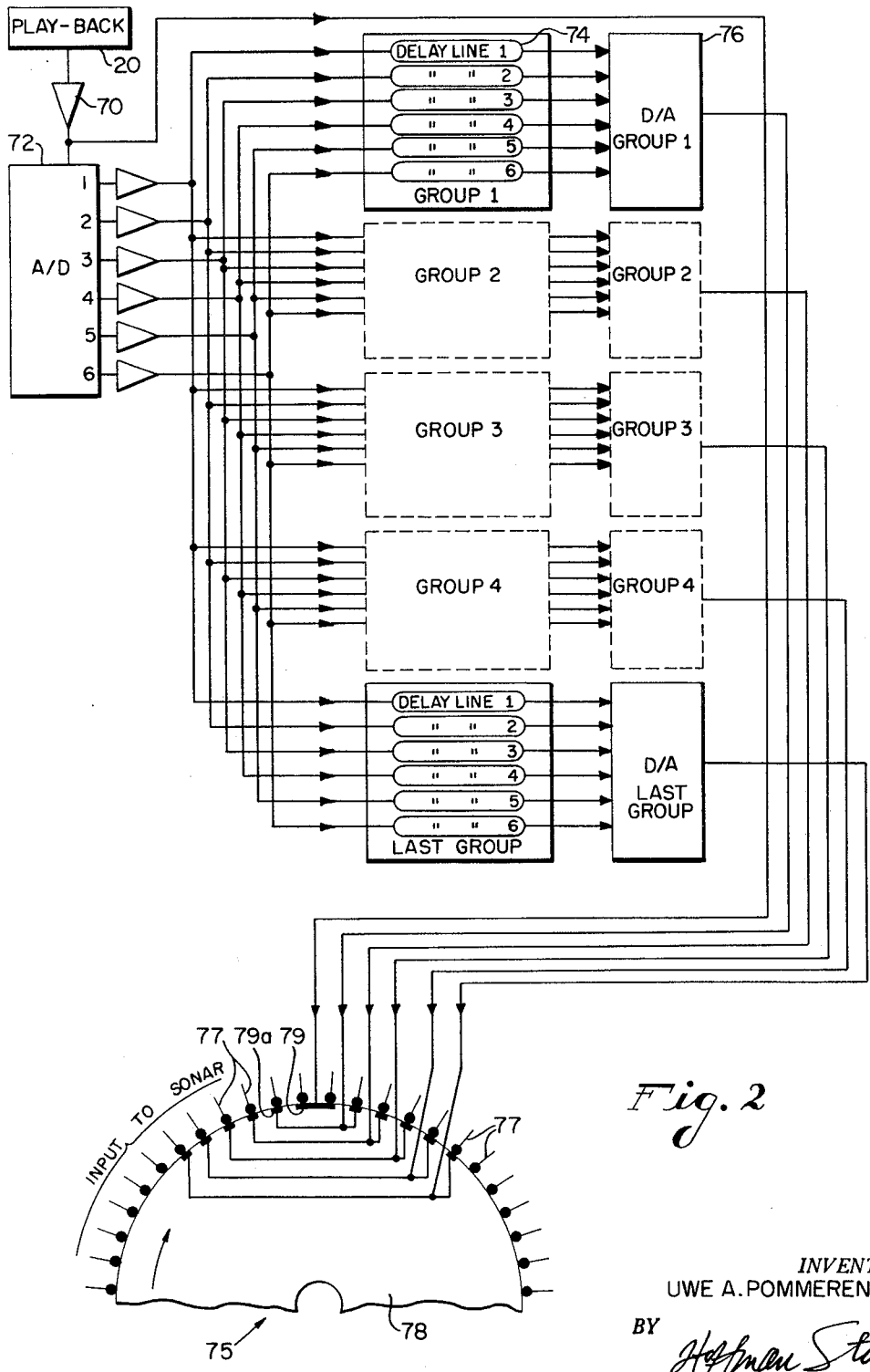
FIGURE 2 is a schematic block diagram of a simulator according to a second embodiment of the invention, which is a modified form of the embodiment shown in FIGURE 1.

The simulator shown in FIGURE 2 is generally similar to the simulator shown in FIGURE 1, except that the signal from the playback equipment 20 is amplified to a higher level by the amplifier 70 such that it may be converted to digital form by an analog-to-digital convertor 72, which may have, for example, six or more binary coded outputs. The various outputs from the convertor 72 are then delayed similarly to the signal delays hereinabove described, but through separate glass delay lines 74, which are available with a higher degree of delay accuracy than the usual electrical delay line. One set of glass delay lines 74 is required for each different sonar delay required in the system.

After the signals have been delayed, they are passed through a digital-to-analog convertor 76, and then may be distributed to the various inputs of the sonar by TDM techniques exactly as described hereinabove and as shown in FIGURE 1. Alternatively, as shown in FIGURE 2, the delayed signals may be distributed by a simple, mechanically or manually driven rotary switch 75. The switch 75, as shown, has forty eight fixed contacts 77, each connected to a corresponding input of the sonar, and a rotor 78 carrying eleven wiping contacts 79 and 79a. The middle wiping contact 79 spans two of the fixed contacts 77. The remaining wiping contacts 79a each contact only a single respective one of the fixed contacts 77, and are connected symmetrically in pairs. The signal is fed directly from the amplifier 70 to the middle wiping contact 79, and from the respective outputs of the digital-to-analog converter 76 to the respective pairs of the remaining wiping contacts 79a. The effect at the sonar is as if an echo signal were being received from the direction of the angle bisector between the hydrophones that are simulated through the two fixed contacts 77 engaged by the middle wiping contact 79.

Figure 3A:
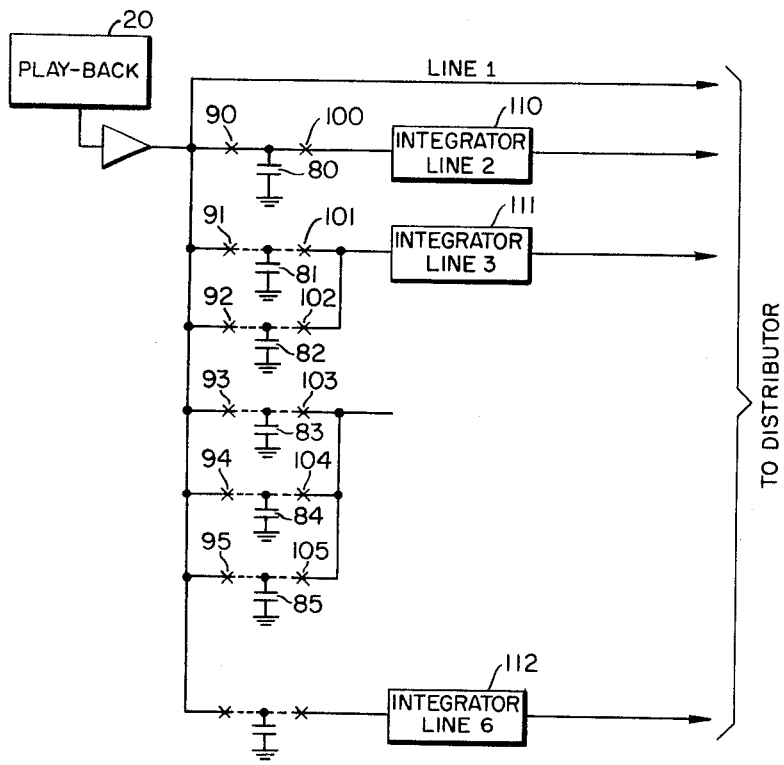
FIGURE 3A is a schematic diagram, partly in block form of a simulator in accordance with a third embodiment of the invention; and, FIGURE 3B is a schematic diagram in block form of a control circuit for use with the simulator shown in FIGURE 3A.
Figure 3B:
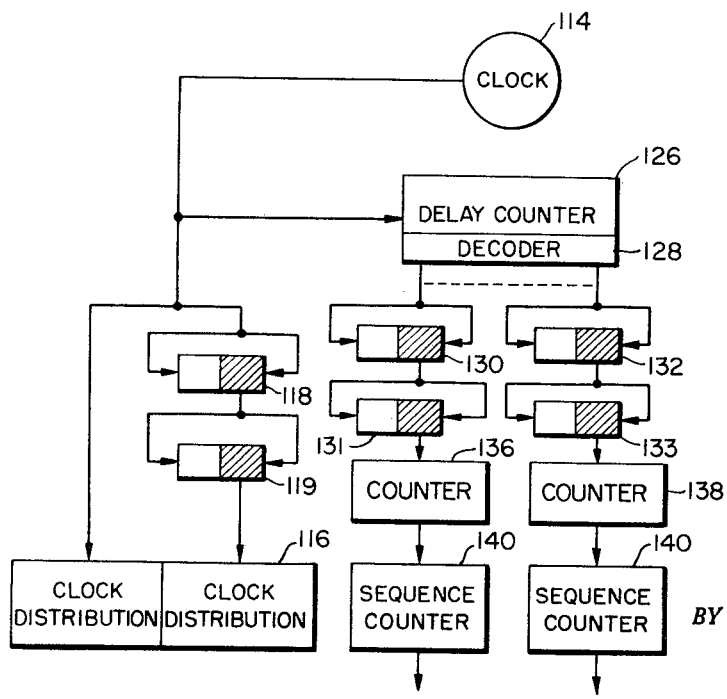

The simulator shown in FIGURES 3A and 3B makes use of a different, and somewhat more complex delay arrangement than those so far described. In the embodiment of FIGURES 3A and 3B, the signal is delayed by feeding it from the play-back unit 20 to a bank of capacitors 80, 81, 82, 83, 84, and 85, where it is stored for various different intervals before being delivered to the sonar inputs. In cases where a fairly long time frame may be used, a single capacitor will suffice for each different delay. However, for optimum results, it is preferred to use a fairly short time frame such as about 50 microseconds, which is considerably shorter than the maximum delay interval required for synthesizing the directional information for the sonar equipment. Accordingly, for most of the delay intervals, more than one capacitor is required and the signal is stored over more than one time frame.

In the system as shown, the signal from the play-back unit 20 is fed selectively into the capacitors 80–85 during the first time slot of each frame through input gates 90, 91, 92, 93, 94, and 95. The capacitors 80–85 are then discharged into integrating circuits 110, 111, and 112, respectively, during subsequent time slots, in accordance with the various respective delays required, through the time slots gates 100, 101, 102, 103, 104, and 105. Where the particular delay is shorter than the time frame as, for example, in the case of the first integrating circuit 110, only a single capacitor 80 is needed, and the amplified signal from the play-back unit 20 is fed to the capacitor 80 in the first time slot of each frame and gated out of the capacitor during a subsequent time slot of the same frame.

Where the delay required is longer than a single time frame but less than two time frames as, for example, in the second integrating circuit 111, two capacitors 81 and 82 are used in alternation. The signal is fed during the first time slot of one frame to the first capacitor 81, and during the first time slot of the next succeeding frame, to the second capacitor 82. The first capacitor 81 is discharged into the integrating circuit 111 in the proper time slot during the second time frame. In general, the number of capacitors in each channel is one more than the number of whole time frames encompassed by the delay interval desired for the channel.

The timing of the system shown is based on a four megacycle clock 114 to achieve a high degree of accuracy in timing the various different delays. The four megacycle clock 114 drives a delay counter 126 to provide timing relationships accurate to a quarter of a microsecond in the operation of the various different time slot gates 100–105. The system clock 116 is driven from the four megacycle clock at a one megacycle rate through a pair of series connected, frequency dividing flip-flops 118 and 119.

The delay counter 126 produces signals, which are fed through a decoder 128 and through respective pairs of frequency dividing flip-flops 130 and 131, and 132 and 133 to start the respective counters 136 and 138 at the relative to the time frame of the system. There is one counter 136 or 138 for each delay channel in the system, although for the sake of simplifying the drawing only two are shown. Each of the counters 136 and 138 produces an output signal once in each time frame to operate one of the time slot gates 100–105 in the channel to which the counter is assigned. The choice of gates is determined by a sequence counter 140, which is ommited from the circuit in the case where only a single capacitor is needed to achieve the required delay.

The outputs of the clocks 114 and 116 are distributed in accordance with conventional practice to the various different parts of the system to ensure maintenance of proper synchronization throughout.

The signals are reconstituted, delayed in time relative to the signal from the play-back unit 20, from the samples withdrawn from the capacitors 100–105 by the integrating circuits 110–112. The reconstituted signals are then fed to the inputs of the sonar by any desired arrangement.

What is claimed is:

1. A sonar target simulator comprising means for producing an electrical signal in response to a stored signal, means for delaying the produced electrical signal for different predetermined intervals, and means for selectively applying the signal so delayed to different respective electrical inputs of a sonar equipment.

2. A target simulator for a sonar equipment or the like of the type having plural electrical input terminals and means for deriving significant information responsively to differences in the times at which a selected signal is applied to different ones of the input terminals, said simulator comprising means for producing an electrical signal responsively to indicia carried by a storage medium, and means for producing plural output signals similar to said electrical signal and delayed in time relative thereto by intervals of significance to the sonar equipment for which said simulator is designed, whereby said intervals taken together represent a synthesis of the significant information.

3. A target simulator in accordance with claim 2, wherein said means for producing plural output signals comprises plural electrical delay lines.

4. A target simulator in accordance with claim 2, wherein said electrical signal is in analog form and said means for producing plural output signals comprises an analog-to-digital convertor for producing a signal in digital form responsively to said electrical signal, separate groups of glass delay lines for delaying the digital signal from said convertor, each group of said lines being operative to delay the digital signal by an interval different from every other of said groups, and digital-to-analog convertors for converting the outputs of said lines to analog form.

5. A target simulator in accordance with claim 2, wherein said means for producing plural output signals comprises a bank of capacitors, means for periodically charging said capacitors to levels indicative of the instantaneous values of said electrical signal at predetermined timed spaced intervals, means for discharging said capacitors in predetermined timed sequence relative to the times at which they are charged, integrating means responsive to the discharge of said capacitors for producing output signals similar to said electrical signal but delayed relative thereto.

6. A target simulator for a sonar equipment or the like of the type having plural electrical input terminals and means for deriving significant information responsively to differences in the times at which a selected signal is applied to different ones of the input terminals, said simulator comprising means for producing an electrical signal responsively to indicia carried by a storage medium, means for producing plural output signals similar to said electrical signal and delayed in time relative thereto by intervals of significance to the sonar equipment for which said simulator is designed, and means for selectively applying said electrical signal and said output signals to selected respective ones of the input terminals of the sonar equipment.

7. A target simulator in accordance with claim 6, wherein said selective applying means comprises a time division multiplex system including a highway, gate means for feeding samples of said electrical signal and said output signals onto said highway in different respective time slots of a predetermined time frame, and gate means for selectively feeding the signal samples from said highway to selected ones of the input terminals of the sonar equipment.

No references cited.

RODNEY D. BENNETT, *Primary Examiner.*

T. H. TUBBESING, *Assistant Examiner.*